(12) United States Patent
Patel et al.

(10) Patent No.: US 10,393,167 B2
(45) Date of Patent: Aug. 27, 2019

(54) SELF-LOCKING PLUG ASSEMBLY

(71) Applicant: SPS TECHNOLOGIES, LLC, Jenkintown, PA (US)

(72) Inventors: Nilesh Patel, Irvine, CA (US); Ismael Pacheco, Mission Viejo, CA (US)

(73) Assignee: SPS TECHNOLOGIES, LLC, Jenkintown, PA (US)

( * ) Notice: Subject to any disclaimer, the term of this patent is extended or adjusted under 35 U.S.C. 154(b) by 218 days.

(21) Appl. No.: 15/622,436

(22) Filed: Jun. 14, 2017

(65) Prior Publication Data

US 2018/0363692 A1    Dec. 20, 2018

(51) Int. Cl.
| | | |
|---|---|---|
| *F16B 39/22* | (2006.01) | |
| *F16B 39/282* | (2006.01) | |
| *F16B 5/02* | (2006.01) | |
| *G02B 23/24* | (2006.01) | |
| *F01D 21/00* | (2006.01) | |
| *F02B 77/00* | (2006.01) | |

(52) U.S. Cl.
CPC .......... *F16B 39/282* (2013.01); *F16B 5/0241* (2013.01); *G02B 23/2492* (2013.01); *F01D 21/003* (2013.01); *F02B 77/005* (2013.01)

(58) Field of Classification Search
CPC .......... F16B 31/02; F16B 39/22; F16B 39/32; F16B 37/14; F01D 21/003; F02B 77/005
USPC .............. 411/1, 6, 7, 372.5, 372.6
See application file for complete search history.

(56) References Cited

U.S. PATENT DOCUMENTS

| | | | |
|---|---|---|---|
| 5,897,277 A | 4/1999 | Barre et al. | |
| 5,967,721 A * | 10/1999 | Giachinta | F16B 39/282 411/120 |
| 8,840,348 B2 | 9/2014 | Marc | |
| 9,574,599 B2 * | 2/2017 | Marc | F01D 21/003 |
| 2007/0048105 A1 * | 3/2007 | Baker | H05K 7/1412 411/1 |
| 2014/0334894 A1 * | 11/2014 | Marchand | F16B 31/027 411/1 |
| 2015/0006393 A1 | 3/2015 | Marc | |
| 2015/0330436 A1 | 11/2015 | Marc | |
| 2017/0198741 A1 * | 7/2017 | Marc | F16B 39/22 |

\* cited by examiner

*Primary Examiner* — Roberta S Delisle
(74) *Attorney, Agent, or Firm* — Burris Law, PLLC

(57) ABSTRACT

A self-locking plug assembly is provided that includes a plug, a lower clutch disposed around the plug and defining engagement features, an upper clutch disposed around the plug and defining mating engagement features, a resilient member and a cap surrounding the resilient member and disposed around a proximal end portion of the plug. The mating engagement features are configured to apply higher torque to the engagement features in one direction than in an opposite direction. In one form, the engagement features of the lower clutch and upper clutch comprise a plurality of teeth arranged around a central aperture.

35 Claims, 11 Drawing Sheets

SELF-LOCKING PLUG ASSEMBLY

FIELD

The present disclosure relates generally to self-locking plugs and more particularly to self-locking plugs for use in inspection ports with one-sided access.

BACKGROUND

The statements in this section merely provide background information related to the present disclosure and may not constitute prior art.

Borescopes allow for visual inspection of engine components to find anomalies or defects in areas that may not be accessible without disassembling engine components. The use of borescopes thus reduces unnecessary time, maintenance, potential damage, and overall costs. Borescope inspections are commonly used in engines such as aircraft engines, diesel engines, automotive engines, and industrial gas turbines, among others.

Common engine components where borescope inspections are desired may include a compressor, combustion chamber, or turbine section that contain borescope inspection ports integrated into the engine structure or case in which the borescope is navigated through. It is common for engine components to have double-walled structures or casings with opposing holes. Borescope plugs close the inspection ports when the ports are not being used for inspection.

Some challenges associated with borescope plugs may include vibrations during engine operation that cause the borescope plug to become loose therefore resulting in damage to the engine component or loss of the plug. A loose borescope plug may also create leakage of dangerous high pressure engine fumes.

SUMMARY

The present disclosure provides for a self-locking plug assembly comprising a plug member defining a proximal end portion having a tool engagement feature and an external flange, a lower clutch, an upper clutch, a resilient member, and a cap. The lower clutch defines a central aperture and a plurality of teeth arranged around the central aperture, each of the plurality of teeth includes first and second angled faces, wherein the first angled faces define angles that are steeper than the second angled faces. The lower clutch is disposed around the plug member and against the external flange and further comprising at least one locking feature. The upper clutch defines a central aperture and a plurality of teeth arranged around the central aperture, each of the plurality of teeth includes first and second mating angled faces, wherein the first and second mating angled faces are configured to mate with the first and second angled faces of the lower clutch. The upper clutch is disposed around the plug member and against the lower clutch. The resilient member is disposed around the proximal end portion of the plug member and the cap surrounds the resilient member and is disposed around the proximal end portion of the plug member. The first angled faces of the upper clutch are configured to apply higher torque in one direction than the second angled faces in an opposite direction.

In another form, an assembly is provided and includes a plug, a lower clutch and upper clutch disposed around the plug, a resilient member, and a cap surrounding the resilient member. The cap is disposed around a proximal end portion of the plug. The lower clutch defines engagement features and the upper clutch defines mating engagement features, wherein the mating engagement features are configured to apply higher torque to the engagement features in one direction than in an opposite direction. The engagement features of the lower clutch may define a plurality of teeth having first and second angled faces, and the mating engagement features of the upper clutch define a plurality of teeth having first and second mating angled faces, wherein the first and second mating angled faces of the upper clutch are configured to mate with the first and second angled faces of the lower clutch.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
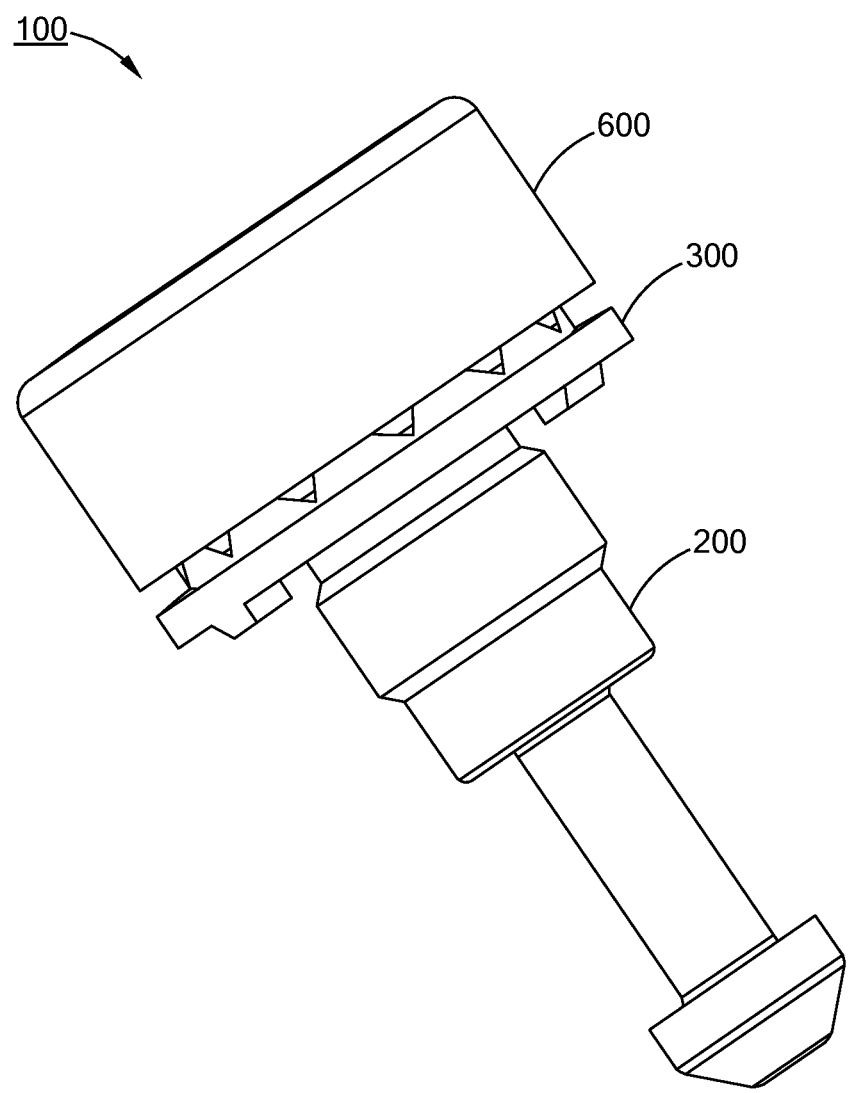
FIG. 1 is a side perspective view of a self-locking plug constructed in accordance with the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
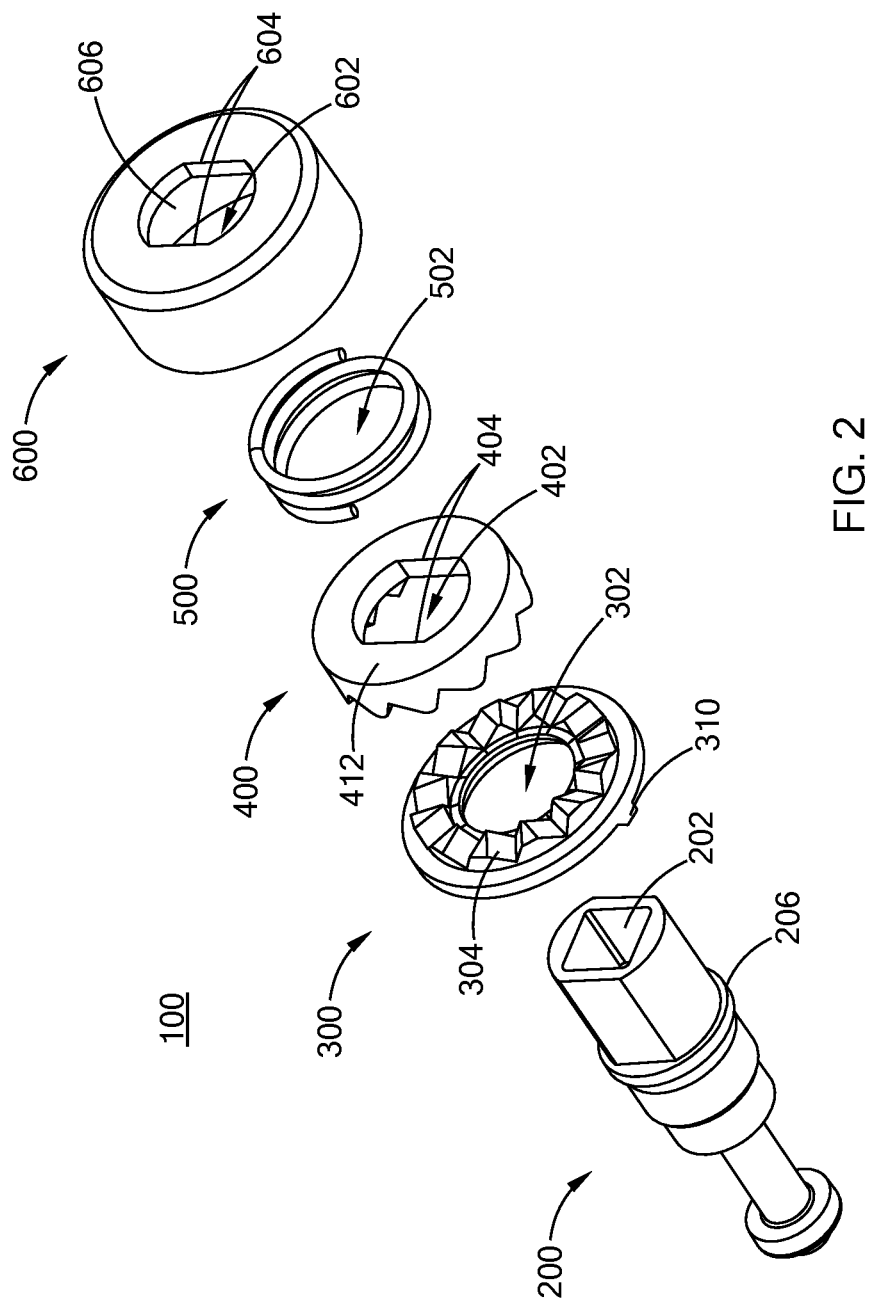
FIG. 2 is an exploded view of the self-locking plug of FIG. 1.
Figure 5:
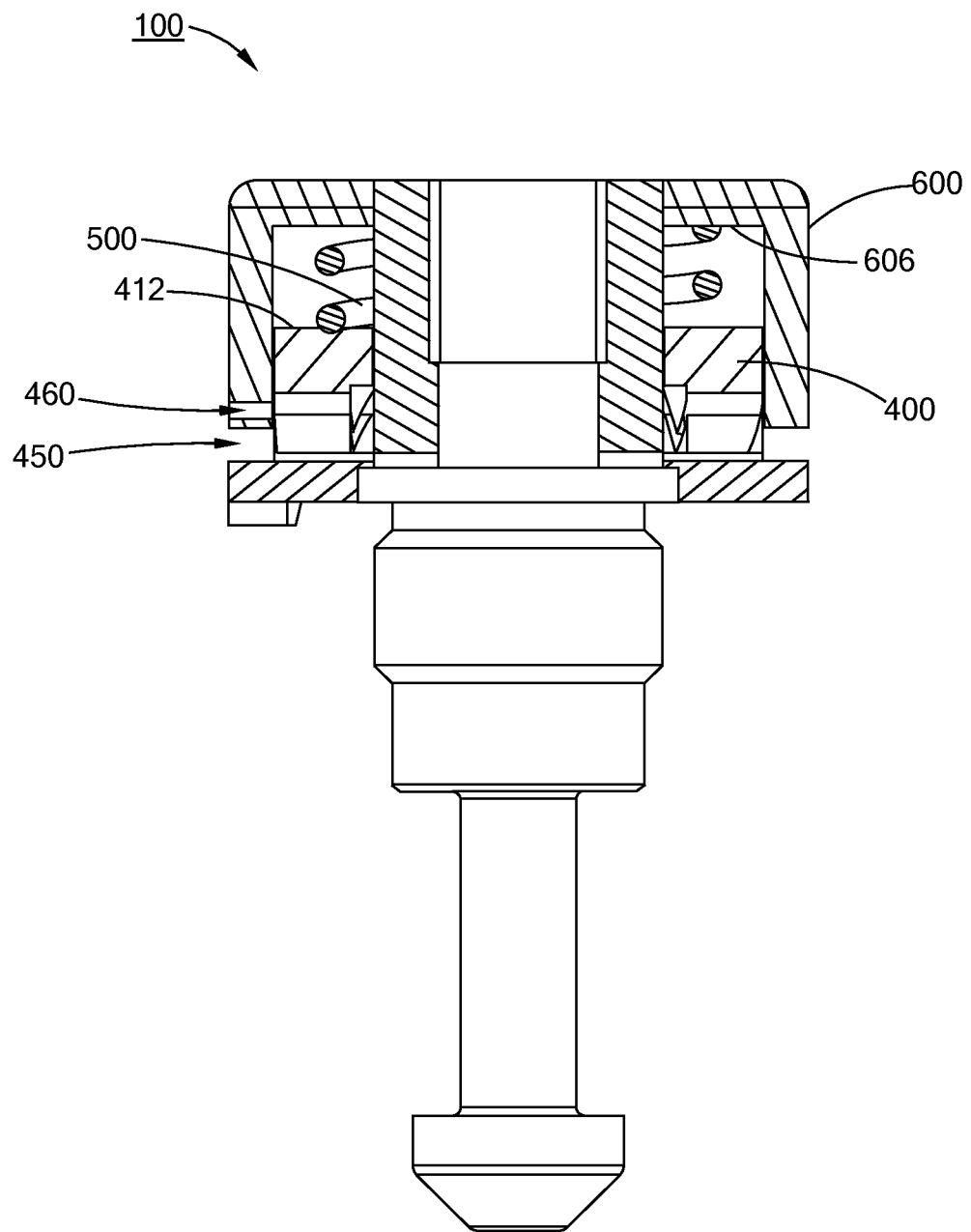
FIG. 5 is a side cross-sectional view of the self-locking plug according to the teachings of the present disclosure.

Referring to FIGS. 1, 2 and 5, a self-locking plug assembly according to the principles of the present disclosure is illustrated and generally indicated by reference numeral 100. The self-locking plug assembly 100 comprises a plug member 200 having an external flange 206, a lower clutch 300 defining a central aperture 302 disposed around the plug member 200 and against the external flange 206 of the plug member 200, an upper clutch 400 defining a central aperture 402 disposed around the plug member 200 and against the lower clutch 300, a resilient member 500 defining a central aperture 502 disposed around a proximal end portion 202 of the plug member 200 and against the upper clutch 400, and a cap 600 defining a central aperture 602 disposed around the proximal end portion 202 of the plug member 200. Further, the cap 600 surrounds the resilient member 500.

The components of the self-locking plug assembly 100 may be any of a variety of materials and in one form, each of the components is a wear resistant material such as for example a nickel alloy. Other wear resistant materials may be employed such as steel or other alloys, among other non-metallic materials, or materials that are coated or plated with a wear resistant material In one form, the resilient member 500 is a steel material. It should be understood, however, that other materials may also be employed while remaining within the scope of the present disclosure.

Figure 3:
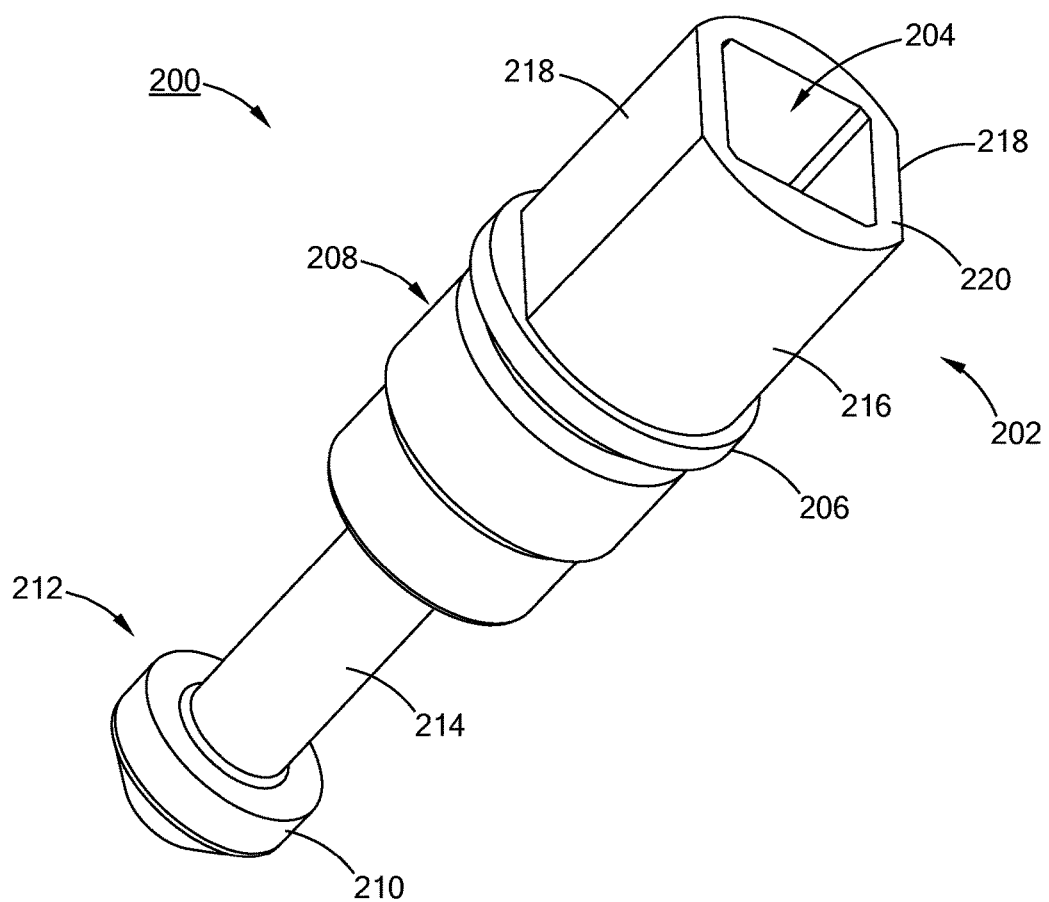
FIG. 3 is a top perspective view of a plug member according to the teachings of the present disclosure.

Referring to FIG. 3, the proximal end 202 of the plug member 200 includes a tool engagement feature 204 operable to receive a tool such as a wrench or ratchet, among others. In this form, the tool engagement feature 204 is located at a central portion of the plug member 200 and has a square geometry for receiving a square drive head of the wrench and/or ratchet. The present disclosure is not limited to this specific tool engagement configuration and other configurations such as for example a hexagonal configuration, among others, may be employed while remaining within the scope of the present disclosure. An externally threaded portion 208 is disposed generally under the external flange 206 and is configured to engage with internal threads of an adjacent component as described in greater detail below. A sealing member 210 is disposed on a distal end 212 of the plug member 200 configured to close a hole, for example a hole of an inner wall or casing, which is also illustrated and described in greater detail below.

In one form, the plug member 200 includes an axial shaft 214 extending between the external flange 206 and the sealing member 210. The axial shaft 214 has a length sufficient for the sealing member 210 to seal a hole/opening of an inner wall/casing and the externally threaded portion 208 of the plug member 200 to engage with internal threads of an adjacent component or outer wall/casing to seal a corresponding hole of the outer wall/casing, which is described in greater detail below.

The proximal end 202 of the plug member 200 further defines a locating feature to engage with the upper clutch 400 and the cap 600. In one form, the locating feature comprises opposed flats 218 between rounded portions 216. The present disclosure is not limited to this specific locating feature configuration, and other configurations may be employed while still remaining within the scope of the present disclosure. Alternate forms, for example, may include a key or locating tab (not shown), among others.

Referring back to FIG. 2, the central aperture 402 of the upper clutch 400 defines a mating locating feature to mate with the locating feature (e.g., opposed flats 218) on the proximal end 202 of the plug member 200. Similarly, the central aperture 602 of the cap 600 also defines a mating locating feature to mate with the locating feature of the plug member 200. In one form, the mating locating features of the upper clutch 400 and the cap 600 are opposed flats 404 and 604, respectively, which are configured to mate with the opposed flats 218 of the plug member 200. Accordingly, when the plug member 200 is rotated, the cap 600 and the upper clutch 400 are engaged with the plug member 200 such that the cap 600 and upper clutch 400 integrally rotate with the plug member 200. The present disclosure is not limited to the specific mating locating features illustrated herein, and it should be understood that other configurations may be employed while still remaining within the scope of the present disclosure.

Figure 4:
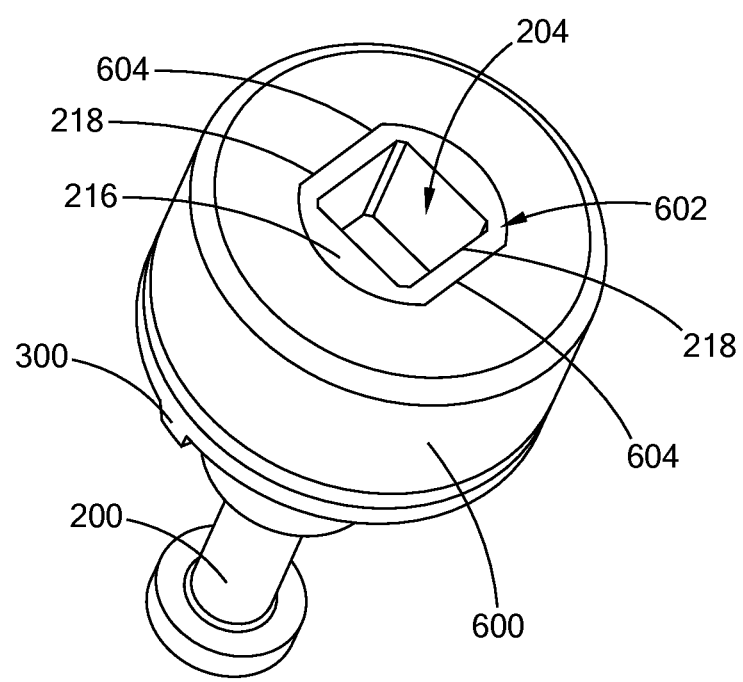
FIG. 4 is a top perspective view of the self-locking plug of FIG. 1.

Referring to FIG. 4, a top perspective view of the self-locking plug assembly 100 illustrates the mating locating feature of the cap 600 having opposed flats 604 mating with the locating feature of the plug member having opposed flats 218. When a tool (not shown) engages the tool engagement feature 204 to rotate the plug member 200, the cap 600 and the upper clutch 400 integrally rotate with the plug member 200.

Referring to FIG. 5, a side cross-sectional view of the self-locking plug assembly 100 is illustrated according to the teachings of the present disclosure. The cap 600 defines an internal face 606 and surrounds the resilient member 500, and the upper clutch 400 defines an external proximal face 412. The resilient member 500 engages the internal face 606 of the cap 600 and the external proximal face 412 of the upper clutch 400 to apply a resilient force to the upper clutch 400. In one form, the resilient member 500 is a mechanical spring, as shown. However, the resilient member 500 is not limited to a mechanical spring and other devices such as an elastic body or any device that applies a pre-load may be employed while remaining within the scope of the present disclosure. The pre-load of the resilient member 500 is used to maintain positive contact between the upper clutch 400 and the lower clutch 300 during installation and removal of the self-locking plug assembly 100.

Figure 6:
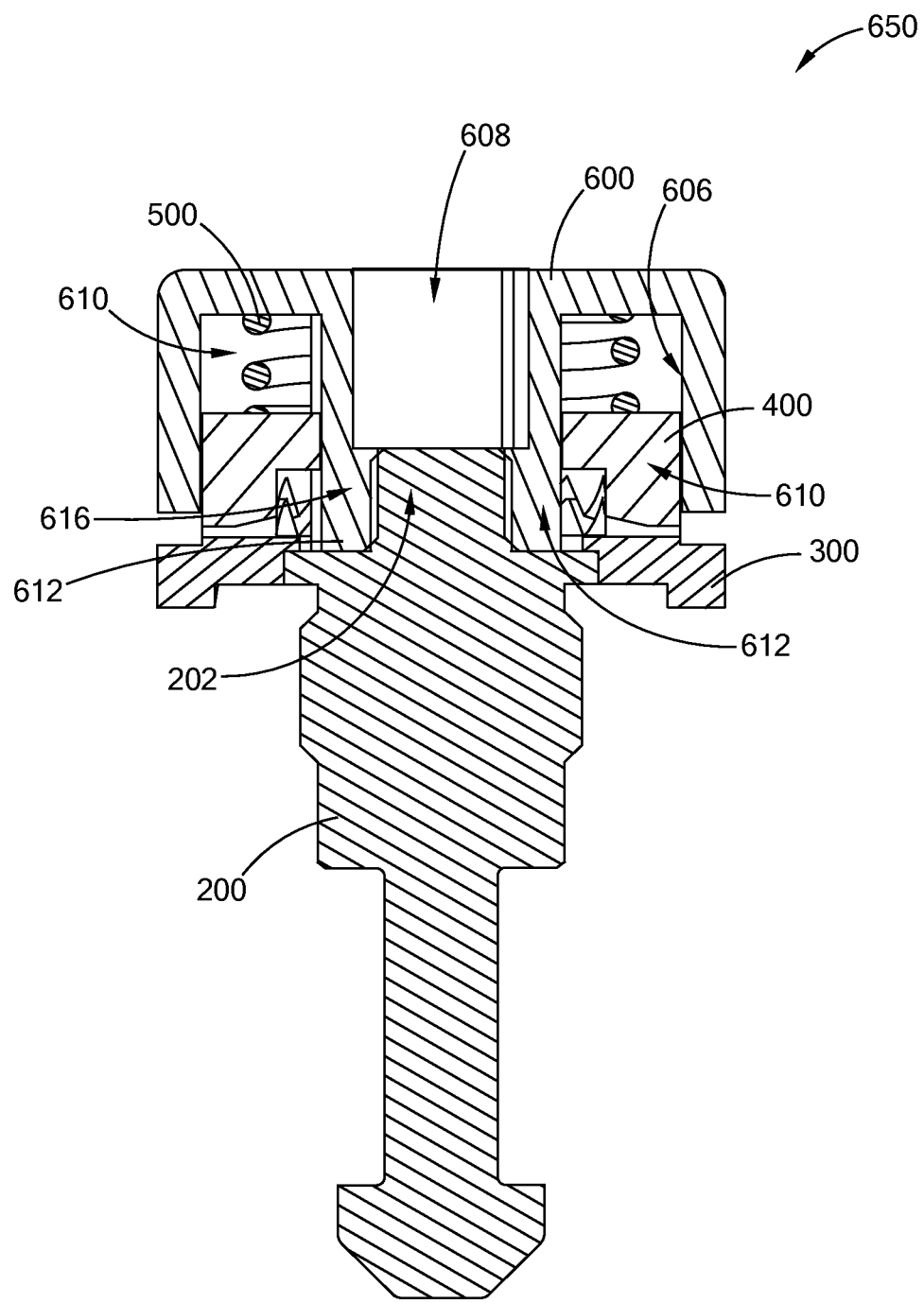
FIG. 6 is a side cross-sectional view of another form of a self-locking plug according to the teachings of the present disclosure.

Referring to FIG. 6, another form of the self-locking plug assembly is illustrated and generally indicated by reference numeral 650. In this form, an inner wall 612 of the cap 600 and the internal face 606 of the cap defines a cavity 610 that houses the lower clutch 300, the upper clutch 400, and the resilient member 500. A tool engagement feature 608 is located at a central portion and extends into the cap 600 as shown. A central distal end 616 of the inner wall 612 of the cap 600 surrounds the proximal end 202 of the plug member 200 as is secured thereto. In one form, the cap 600 and the plug member 200 are secured by laser welding. However, it should be understood that other forms of attachment may be implemented such as for example by soldering, a high strength adhesive, among others while still remaining within the scope of the present disclosure.

Figure 7:
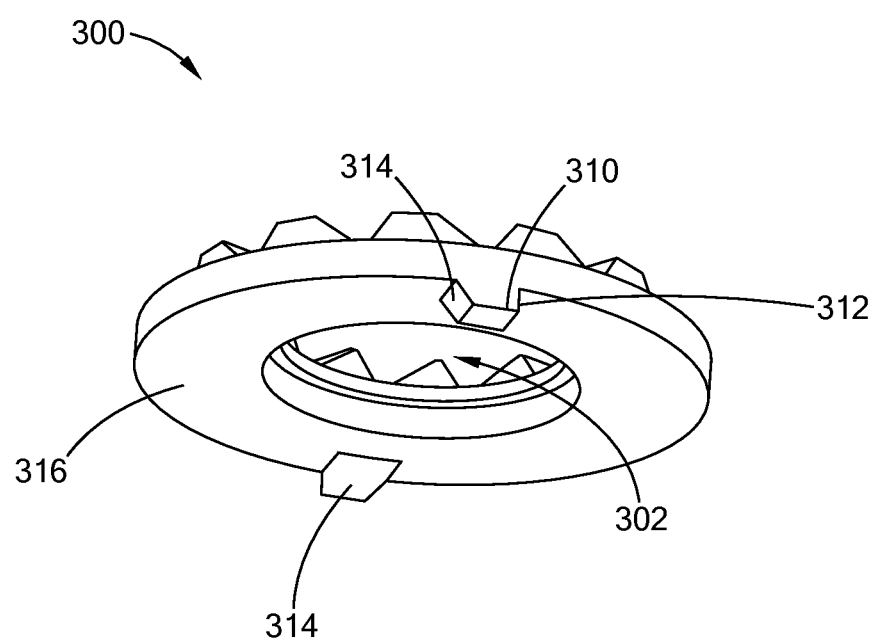
FIG. 7 is a bottom perspective view of a lower clutch according to the teachings of the present disclosure.

Referring to FIG. 7, a bottom perspective view of the lower clutch 300 is illustrated according to the teachings of the present disclosure. The central aperture 302 of the lower clutch 300 defines a geometric shape that allows the lower clutch 300 to freely rotate around the proximal end 202 of the plug member 200. The lower clutch 300 further comprises at least one locking feature 310 adapted to engage a recess in an adjacent component. In one form, the locking feature 310 may define at least one protrusion 310 disposed on a bottom surface 316 of the lower clutch 300. The at least one protrusion 310 defines at least two angled faces 312 and 314, wherein the first angled face 314 defines a first angle and the second angled face 312 defines a second angle that is steeper than the first angle.

The locking feature 310 is not limited to any configuration and may take other configurations while still remaining within the scope of the present disclosure, for example the locking feature 310 may be a recess for engagement with a protrusion in an adjacent component. In another form, the locking feature 310 may be a protrusion that extends radially instead of axially as shown from the lower clutch 300. Therefore, it should be understood that the locking feature 310 is not limited to any particular shape or orientation and may be located on the lower clutch 300 and or the adjacent component while remaining within the scope of the present disclosure.

Figure 8:
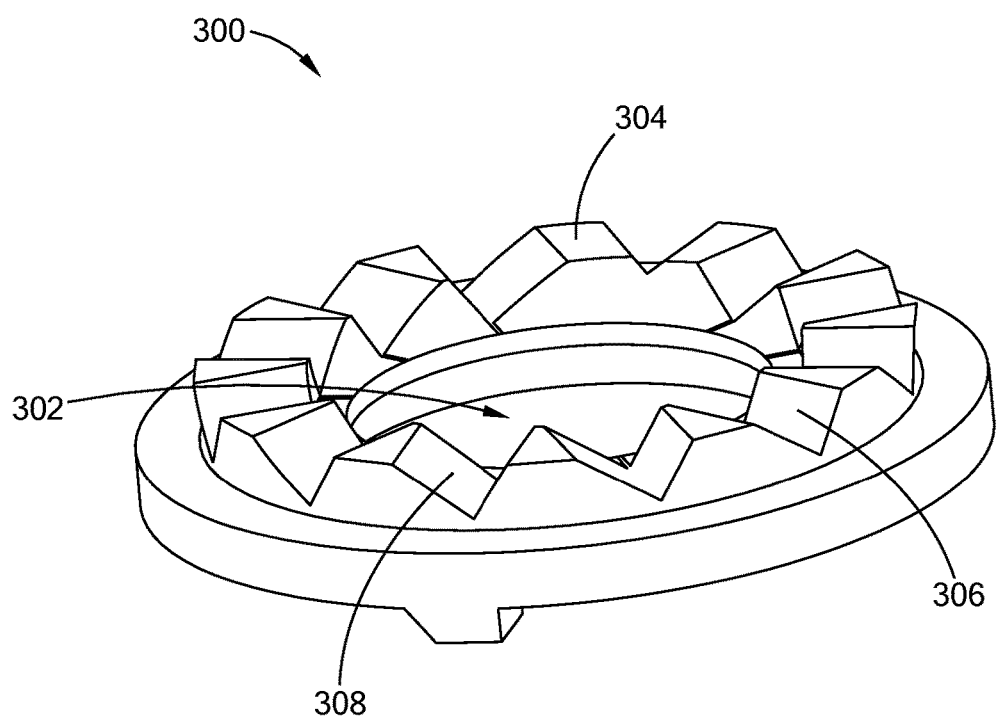
FIG. 8 is a top perspective view of a lower clutch according to the teachings of the present disclosure.

Referring to FIG. 8, a top perspective view of the lower clutch 300 is illustrated and further defines engagement features 304 arranged around the central aperture 302. In one variation, the engagement features 304 are in the form of a plurality of teeth 304, each of the plurality of teeth 304 include a first angled face 306 and a second angled face 308, wherein the first angled faces 306 define angles that are steeper than the second angled faces 308.

Figure 9:
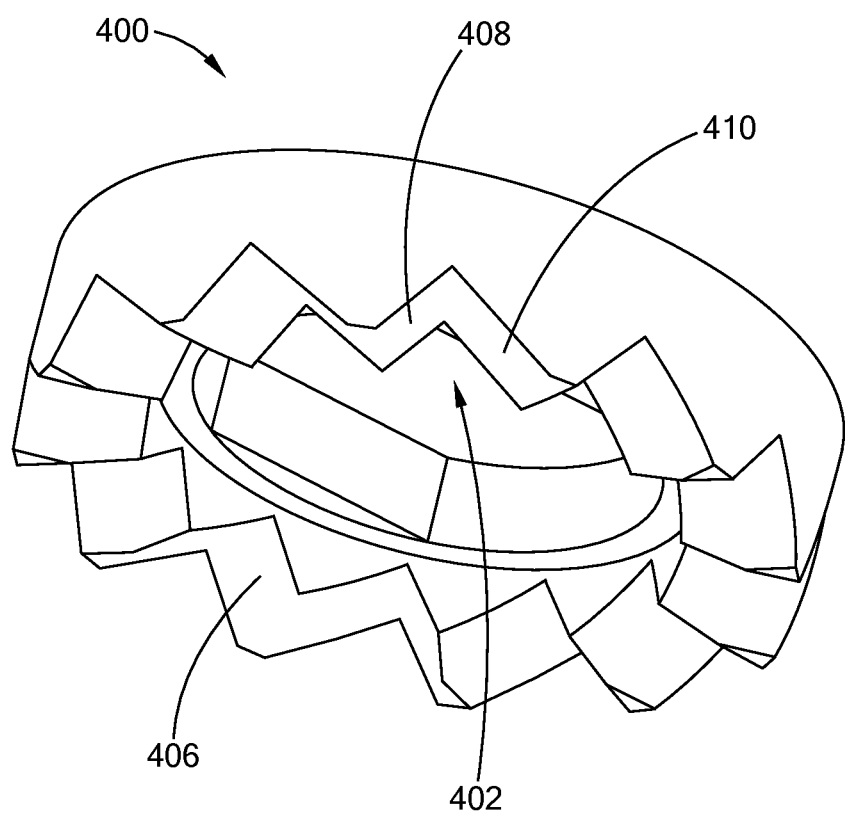
FIG. 9 is a bottom perspective view of an upper clutch according to the teachings of the present disclosure.

Referring to FIG. 9, the upper clutch 400 is illustrated according to the teachings of the present disclosure and defines mating engagement features 406 arranged around the central aperture 402 operable to mate with the engagement features 304 of the lower clutch 300. The mating engagement features 406 of the upper clutch 400 are configured to apply higher torque to the engagement features 304 of the lower clutch 300 in one direction than in another direction, as described in greater detail below. As shown in FIG. 5, the upper clutch 400 is disposed around the plug member 200 and against the lower clutch 300.

In one variation, the mating engagement features 406 of the upper clutch 400 defines a plurality of teeth 406, wherein each of the plurality of teeth 406 include a first mating angled face 408 and a second mating angled face 410, wherein the first and second mating angled faces 408 and 410 are configured to mate with the first and second angled faces 306 and 308, respectively, of the lower clutch 300. The first angled faces 408 of the upper clutch 400 are configured to apply higher torque in one direction than the second angled faces 410 in an opposite direction as described in greater detail below.

Figure 10A:
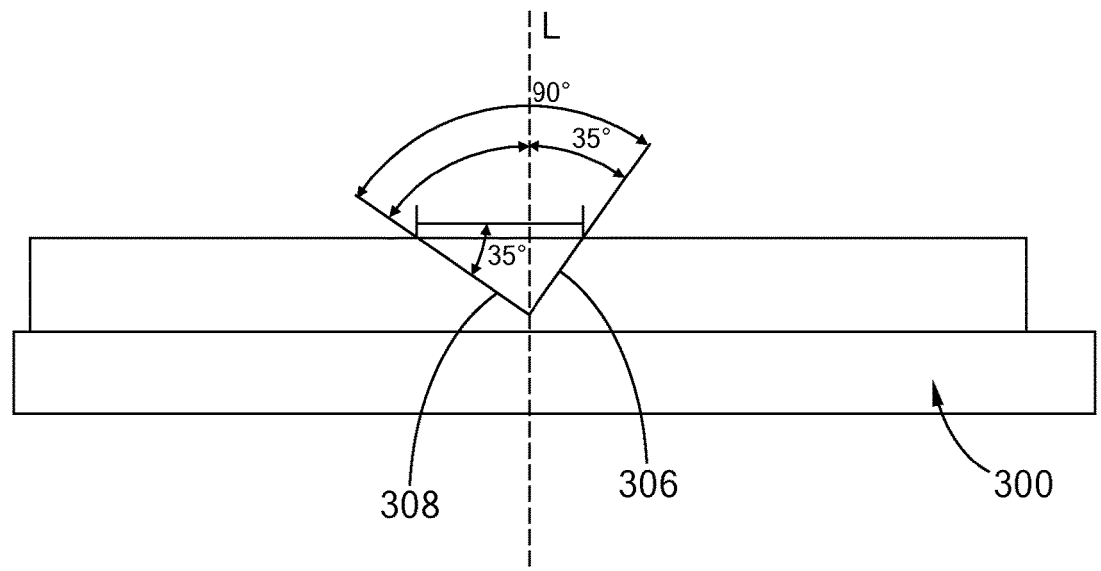
FIG. 10A is a side view of a lower clutch illustrating exemplary angles of engagement features, which in this form are angled faces, according to the teachings of the present disclosure.

Referring to FIG. 10A, exemplary angles for the first and second angled faces 306, 308 of the lower clutch 300 (which correspond with mating angled faces 408 and 410 of the mating engagement features 406 of the upper clutch 400) are shown in greater detail. As shown, the first angled faces 306 define angles that are steeper than the second angled faces 308. In this exemplary form, first angled faces 306 are angled approximately 35° relative to the longitudinal axis L, and the second angled faces 308 are angled approximately 55° relative to the longitudinal axis L. Together, both the angles define a full form clutch profile of approximately 90° as shown. It should be understood that these angles are merely exemplary and should not be construed as limiting the scope of the present disclosure.

Figure 10B:
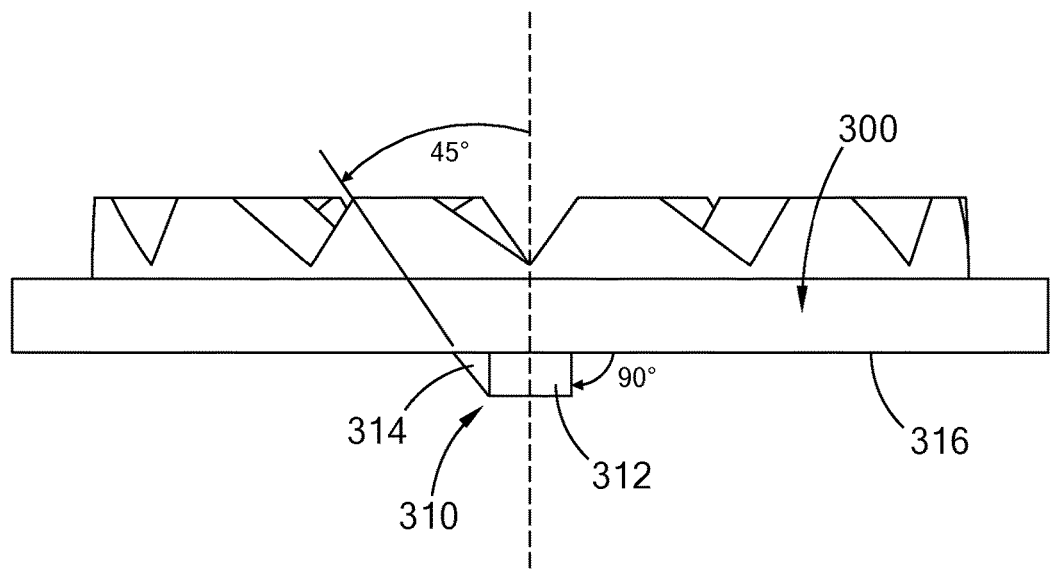
FIG. 10B is a side view of a lower clutch illustrating exemplary angles of a locking feature according to the teachings of the present disclosure.

As further shown in FIG. 10B, exemplary angles for the locking feature 310 of the lower clutch 300 are shown. In this form, the first angled face 314 may be approximately 45° relative to the longitudinal axis L, and the second angled face 312 may be approximately 90° relative to the bottom surface 316 of the lower clutch 300. Accordingly, the second angled face 312 has a steeper angle than the first angled face 314, and a higher torque must be applied in an opposite torqueing direction to fully remove the self-locking plug assembly 100. It should be understood that these angles are merely exemplary and should not be construed as limiting the scope of the present disclosure.

Figure 11:
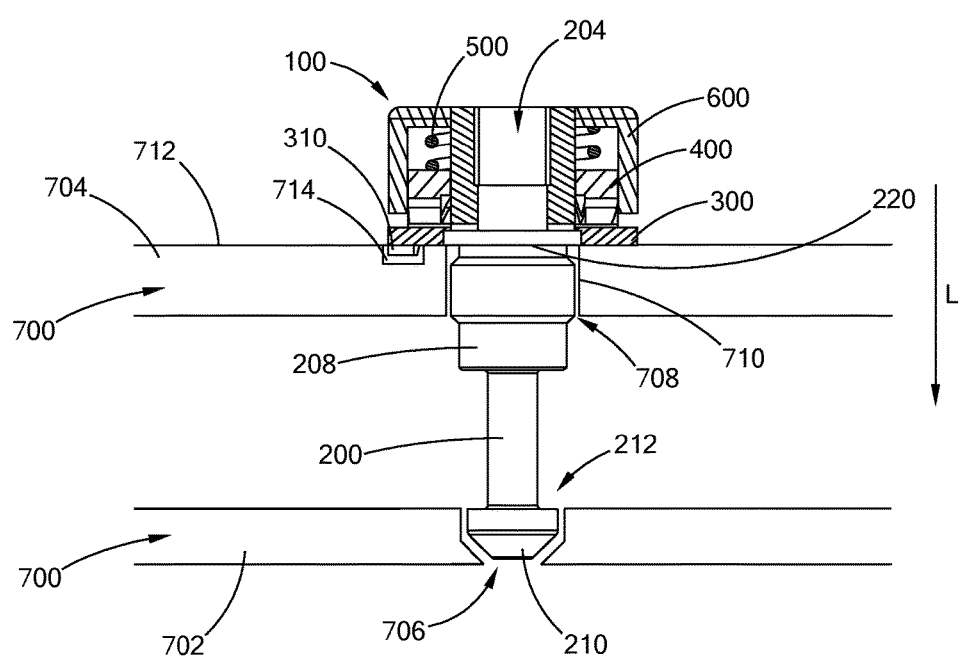
FIG. 11 is a side cross-sectional view of a self-locking plug installed within a double-walled structure according to the teachings of the present disclosure.

Referring to FIG. 11, the self-locking plug assembly 100 according to the present disclosure is illustrated installed within an adjacent component, which in this example is a double-walled structure 700. The double-walled structure 700 for example may include an inner casing 702 and an outer casing 704 having opposed apertures 706 and 708. It should be understood that the double-walled structure 700 is merely exemplary and that any adjacent component may be adapted to receive the self-locking plug assembly 100 while remaining within the scope of the present disclosure.

For installation, the distal end 212 of the plug member 200 is inserted through the aperture 708 of the outer casing 704, and a bottom surface 220 of the external flange 206 of the plug member 200 is adapted to engage a top surface 712 of the outer casing 704. The externally threaded portion 208 of the plug member 200 engages with an internally threaded portion 710 of the aperture 708 of the outer casing 704 to initially secure the assembly 100 in place. The sealing member 210 of the plug member 200 engages the aperture 706 of the inner casing 702 and closes the aperture 706.

A tool is inserted into the tool engagement feature 204, and the entire self-lock plug assembly 100 is rotated (either clockwise or counterclockwise according to the thread directions). As the self-lock plug assembly 100 is rotated, plurality of teeth 304 and 406 of the lower clutch 300 and upper clutch 400 engage one another, and the lower clutch 300 initially freely rotates around the plug member 200. As the plug 200 progresses into the aperture 708, the protrusion 310 of the lower clutch 300 engages a recess 714 of the outer casing 704, thus inhibiting the lower clutch 300 from rotating around the plug member 200. Further rotation of the plug 200 causes compression of the resilient member 500, thereby moving the upper clutch 400 towards the lower clutch 300, and the plurality of teeth 304 and 406 progressively engaging one another and coming closer together in the longitudinal direction indicated by the arrow L. As the upper clutch 400 and the lower clutch 300 are engaged, an audible "clicking"noise can be heard.

When the plug 200 is at its properly torqued position, the upper clutch 400 and the lower clutch 300 are thus locked together and held in place by both the threaded connection between the plug 200 and the adjacent component 700 and the resilient member 500. Because the first angled mating faces 408 and 306 of the upper clutch 400 and lower clutch 300 are at a steeper angle, a higher torque must be applied in an opposite torqueing direction (counterclockwise in this example) to remove the self-locking plug assembly 100. Similarly, because the second angled face 312 of the locking feature 310 of the lower clutch 300 has a steeper angle than the first angled face 314, a higher torque must be applied in an opposite torqueing direction to fully remove the self-locking plug assembly 100. Accordingly, the unique configuration of the engagement features of the upper clutch 400 and the lower clutch 300, which in this form are faces having different angles, provide a robust plug assembly that is tolerant to vibrations and operational forces that tend to loosen/disengage such devices.

Referring back to FIG. 5, to reduce friction and wear between the upper clutch 400 and lower clutch 300, lubrication of the plurality of teeth 304 and 406 may be provided by features of the present disclosure. In one form, lubricant may be inserted or injected through an exposed window 450 between the cap 600 and the lower clutch 300. Alternately, an injection port 460 may be provided through the cap 600 in other forms of the present disclosure. In yet another form, one or both of the clutches 300/400 may be self-lubricating with a surface coating composition such as by way of example molybdenum disulphide, graphite or PTFE (polytetrafluoroethylene).

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A self-locking plug assembly comprising:
a plug member defining a proximal end portion having an external flange;
a lower clutch defining a central aperture and a plurality of teeth arranged around the central aperture, each of the plurality of teeth having first and second angled faces, wherein the first angled faces define angles that are steeper than the second angled faces, the lower clutch further disposed around a rotational axis of the plug member and against the external flange such that the plug is rotatable relative to the lower clutch and the lower clutch further comprising at least one locking feature;
an upper clutch defining a central aperture and a plurality of teeth arranged around the central aperture, each of the plurality of teeth having first and second mating angled faces, wherein the first and second mating angled faces are configured to mate with the first and second angled faces of the lower clutch, the upper clutch disposed around the rotational axis of the plug member and against the lower clutch, the upper clutch being configured for integral rotation with the plug;
a resilient member biasing the upper clutch axially toward the lower clutch; and
a cap surrounding the resilient member and disposed around the rotational axis of the plug member,
wherein the first angled faces of the upper clutch are configured to apply higher torque in one direction than the second angled faces in an opposite direction.

2. The self-locking plug assembly according to claim 1, wherein the plug member defines an externally threaded portion that is configured to engage internal threads of an adjacent component.

3. The self-locking plug assembly according to claim 1, wherein the resilient member is a mechanical spring.

4. The self-locking plug assembly according to claim 1, wherein the cap defines an internal face and the upper clutch defines an external proximal face, and the resilient member engages the internal face of the cap and the external proximal face of the upper clutch to apply a resilient force.

5. The self-locking plug assembly according to claim 1, wherein either the cap or the proximal end portion of the plug member defines a locating feature, and the upper clutch defines a mating locating feature such that when the plug member is rotated, the cap or plug member and the upper clutch are engaged.

6. The self-locking plug assembly according to claim 5, wherein the locating feature defines opposed flats.

7. The assembly according to claim 5, wherein the plug defines the locating feature and the cap defines a mating locating feature configured to mate with the locating feature of the plug such that when the plug is rotated, the plug and cap are engaged.

8. The self-locking plug assembly according to claim 1, wherein the at least one locking feature of the lower clutch defines a protrusion, the protrusion adapted to engage recesses in an adjacent component.

9. The self-locking plug assembly according to claim 8, wherein the protrusion defines at least two faces, wherein one face defines a first angle and the other face defines an angle that is steeper than the first angle.

10. The self-locking plug assembly according to claim 9, wherein the first angle is approximately 45° and the angle of the other face is approximately 90°.

11. The self-locking plug assembly according to claim 1, wherein the first angled faces of the lower clutch are angled at approximately 35° and the second angled faces of the lower clutch are angled at approximately 55°.

12. The self-locking plug assembly according to claim 1, wherein the first and second mating angled faces of the upper clutch are approximately equal to the first and second angled faces of the lower clutch.

13. The self-locking plug assembly according to claim 1, wherein at least the upper clutch is an aluminum material.

14. The self-locking plug assembly according to claim 1, wherein the cap is welded to the plug member.

15. The self-locking plug assembly according to claim 14, wherein the tool engagement feature is located at a central portion of the plug member.

16. The self-locking plug assembly according to claim 1, wherein the plug member defines a tool engagement feature.

17. The self-locking plug assembly according to claim 1, wherein the cap defines a tool engagement feature.

18. An assembly comprising:
a plug;
a lower clutch disposed around a rotational axis of the plug and defining engagement features;
an upper clutch disposed around the rotational axis of the plug and defining mating engagement features;
a resilient member; and
a cap surrounding the resilient member and disposed around the rotational axis of the plug,
wherein the mating engagement features are configured to apply higher torque to the engagement features in one direction than in an opposite direction,
wherein the cap defines an internal face and the upper clutch defines an external proximal face, and the resilient member engages the internal face of the cap and the external proximal face of the upper clutch to apply a resilient force.

19. The assembly according to claim 18, wherein the engagement features of the lower clutch define a plurality of teeth having first and second angled faces, and the mating engagement features of the upper clutch define a plurality of teeth having first and second mating angled faces, wherein the first and second mating angled faces of the upper clutch are configured to mate with the first and second angled faces of the lower clutch.

20. The assembly according to claim 18, wherein the plug is externally threaded.

21. The assembly according to claim 18, wherein the lower clutch comprises at least one locking feature.

22. The assembly according to claim 21, wherein the at least one locking feature of the lower clutch defines a protrusion, the protrusion adapted to engage recesses in an adjacent component.

23. The assembly according to claim 22, wherein the protrusion defines at least two faces, wherein one face defines a first angle and the other face defines an angle that is steeper than the first angle.

24. The assembly according to claim 18, wherein either the cap or a proximal end portion of the plug defines a locating feature, and the upper clutch defines a mating locating feature configured to engage the locating feature such that when the plug is rotated, the cap or plug and the upper clutch are engaged.

25. The assembly according to claim 24, wherein the plug defines the locating feature and the cap defines a mating locating feature configured to mate with the locating feature of the plug such that when the plug is rotated, the plug and cap are engaged.

26. The assembly according to claim 18, wherein the cap is welded to the plug member.

27. A self-locking plug assembly comprising:
a plug member defining a proximal end portion having an external flange;
a lower clutch defining a central aperture and a plurality of teeth arranged around the central aperture, each of the plurality of teeth having first and second angled faces, wherein the first angled faces define angles that are steeper than the second angled faces, the lower clutch further disposed around a rotational axis of the plug member and against the external flange and further comprising at least one locking feature;
an upper clutch defining a central aperture and a plurality of teeth arranged around the central aperture, each of the plurality of teeth having first and second mating angled faces, wherein the first and second mating angled faces are configured to mate with the first and second angled faces of the lower clutch, the upper clutch disposed around the rotational axis of the plug member and against the lower clutch;
a resilient member disposed around the rotational axis of the plug member; and
a cap surrounding the resilient member and disposed around the rotational axis of the plug member,
wherein the first angled faces of the upper clutch are configured to apply higher torque in one direction than the second angled faces in an opposite direction,
wherein the cap defines an internal face and the upper clutch defines an external proximal face, and the resilient member engages the internal face of the cap and the external proximal face of the upper clutch to apply a resilient force.

28. A self-locking plug assembly comprising:
a plug member defining a proximal end portion having an external flange;
a lower clutch defining a central aperture and a plurality of teeth arranged around the central aperture, each of the plurality of teeth having first and second angled faces, wherein the first angled faces define angles that are steeper than the second angled faces, the lower clutch further disposed around a rotational axis of the plug member and against the external flange and further comprising at least one locking feature;
an upper clutch defining a central aperture and a plurality of teeth arranged around the central aperture, each of the plurality of teeth having first and second mating angled faces, wherein the first and second mating angled faces are configured to mate with the first and second angled faces of the lower clutch, the upper clutch disposed around the rotational axis of the plug member and against the lower clutch;
a resilient member disposed around the rotational axis of the plug member; and
a cap surrounding the resilient member and disposed around the rotational axis of the plug member,
wherein the first angled faces of the upper clutch are configured to apply higher torque in one direction than the second angled faces in an opposite direction,
wherein the proximal end portion of the plug member defines a locating feature, and the cap and the upper clutch define a mating locating feature such that when the plug member is rotated, the cap and the upper clutch are engaged.

29. The self-locking plug assembly according to claim 28, wherein the locating feature defines opposed flats.

30. A self-locking plug assembly comprising:
a plug member defining a proximal end portion having an external flange;
a lower clutch defining a central aperture and a plurality of teeth arranged around the central aperture, each of the plurality of teeth having first and second angled faces, wherein the first angled faces define angles that are steeper than the second angled faces, the lower clutch further disposed around a rotational axis of the plug member and against the external flange and further comprising at least one locking feature;
an upper clutch defining a central aperture and a plurality of teeth arranged around the central aperture, each of the plurality of teeth having first and second mating angled faces, wherein the first and second mating angled faces are configured to mate with the first and second angled faces of the lower clutch, the upper clutch disposed around the rotational axis of the plug member and against the lower clutch;
a resilient member disposed around the rotational axis of the plug member; and
a cap surrounding the resilient member and disposed around the rotational axis of the plug member,
wherein the first angled faces of the upper clutch are configured to apply higher torque in one direction than the second angled faces in an opposite direction,
wherein the at least one locking feature of the lower clutch defines a protrusion, the protrusion adapted to engage recesses in an adjacent component.

31. The self-locking plug assembly according to claim 30, wherein the protrusion defines at least two faces, wherein one face defines a first angle and the other face defines an angle that is steeper than the first angle.

32. The self-locking plug assembly according to claim 31, wherein the first angle is approximately 45° and the angle of the other face is approximately 90°.

33. An assembly comprising:
a plug;
a lower clutch disposed around a rotational axis of the plug and defining engagement features;
an upper clutch disposed around the rotational axis of the plug and defining mating engagement features;
a resilient member; and
a cap surrounding the resilient member and disposed around the rotational axis of the plug,
wherein the mating engagement features are configured to apply higher torque to the engagement features in one direction than in an opposite direction,
wherein the lower clutch comprises at least one locking feature,
wherein the at least one locking feature of the lower clutch defines a protrusion, the protrusion adapted to engage recesses in an adjacent component.

34. The assembly according to claim 33, wherein the protrusion defines at least two faces, wherein one face defines a first angle and the other face defines an angle that is steeper than the first angle.

35. An assembly comprising:
a plug;
a lower clutch disposed around a rotational axis of the plug and defining engagement features;
an upper clutch disposed around the rotational axis of the plug and defining mating engagement features;
a resilient member; and
a cap surrounding the resilient member and disposed around the rotational axis of the plug,
wherein the mating engagement features are configured to apply higher torque to the engagement features in one direction than in an opposite direction,
wherein a proximal end portion of the plug defines a locating feature, and the cap and the upper clutch define a mating locating feature such that when the plug is rotated, the cap and the upper clutch are engaged.

* * * * *